United States Patent
Smithson et al.

(10) Patent No.: US 10,666,559 B2
(45) Date of Patent: May 26, 2020

(54) SIGNALLING PROTOCOL ROUTING SYSTEM

(71) Applicant: Metaswitch Networks Ltd, Enfield (GB)

(72) Inventors: Huw Smithson, Edinburgh (GB); Ben Ritchie, Edinburgh (GB); James Giblin, Edinburgh (GB)

(73) Assignee: METASWITCH NETWORKS LTD, Enfield (GB)

( * ) Notice: Subject to any disclaimer, the term of this patent is extended or adjusted under 35 U.S.C. 154(b) by 101 days.

(21) Appl. No.: 15/979,966

(22) Filed: May 15, 2018

(65) Prior Publication Data

US 2018/0337851 A1 Nov. 22, 2018

(30) Foreign Application Priority Data

May 19, 2017 (GB) .................................. 1708106.8

(51) Int. Cl.
*H04L 12/781* (2013.01)
*H04L 29/06* (2006.01)
*H04L 12/725* (2013.01)

(52) U.S. Cl.
CPC .......... *H04L 45/52* (2013.01); *H04L 65/1006* (2013.01); *H04L 69/08* (2013.01); *H04L 45/304* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 10,116,709 B1* | 10/2018 | Kielhofner | H04L 65/1066 |
| 2011/0096698 A1* | 4/2011 | Wang | H04L 29/06027 370/256 |
| 2011/0110275 A1* | 5/2011 | Shaheen | H04L 65/1086 370/260 |
| 2012/0110208 A1 | 5/2012 | Abrahams et al. | |
| 2016/0323216 A1 | 11/2016 | Levasseur et al. | |
| 2019/0238594 A1* | 8/2019 | Al-Damluji | H04L 65/1006 |

OTHER PUBLICATIONS

RFC 3261—"SIP; Session Initiation Protocol" Rosenberg et al. Jun. 2002 (Year: 2002).*
Great Britain Search Report for Great Britain Application No. 1708106.8 dated Oct. 30, 2017.

* cited by examiner

*Primary Examiner* — Jamaal Henson
(74) *Attorney, Agent, or Firm* — Patterson + Sheridan LLP (57) ABSTRACT

A signalling protocol routing system comprising at least one routing service module and at least one rules processing module, the signalling protocol routing system being capable of accessing additional routing service modules and/or rules processing modules when required. The routing service modules convert protocol messages into deconstructed protocol messages, so that a rules processing module can apply routing rules to the deconstructed protocol messages and determine a route for a message.

20 Claims, 6 Drawing Sheets

SIGNALLING PROTOCOL ROUTING SYSTEM

This application claims foreign priority benefits under 35 U.S.C. § 119(a)-(d) or 35 U.S.C. § 365(b) of British Application Number GB 17 08106.8, filed on May 19, 2017, which is incorporated herein by reference in its entirety.

SUMMARY

The present techniques relate a signalling protocol routing system for routing telephony messages. More particularly, the techniques relate to a Breakout Gateway Control Function for routing telephony messages in an IP Multimedia Subsystem/IP Multimedia Core Network Subsystem (IMS) network.

Telecommunication services are used to route telephone calls between two or more parties, each party using a telecommunication device, such as a telephone/tablet/computer etc. The telecommunication service may comprise multiple different networks of the same or different types, provided by multiple different providers. Examples of different types of networks are landline networks, wireless networks, private networks and Integrated Services Digital Networks (ISDN). In landline networks, such as public switched telephone networks (PSTN), the telecommunication devices are connected via wires to a telephone exchange. In wireless networks, the telecommunication devices are not required to be connected via wires and so can move around within a coverage area of the wireless network. A private network, such as a private branch exchange (PBX), is a closed group of telecommunication devices connected to each other, normally via wires, and which use a gateway to connect to other non-private networks. An Integrated Services Digital Network (ISDN) is a circuit-switched telecommunications network, which allows the digital transmission of voice calls, video calls and/or data calls over PSTN and provides access to packet switched networks.

Calls are often required to be routed within networks, and between different networks, the different networks using the same or different communications protocols. In order to route calls, each network has one or more signalling protocol routers for determining the next hop or next few hops of a calls route within a network. In addition, each network may have one or more gateways providing an interface between networks which use different communications protocols, in order to route calls to different networks.

One example of a signalling protocol router is a Breakout Gateway Control Function (BGCF) which is a Session Initiation Protocol (SIP) router used in IMS networks. A BGCF is used when a session (call) cannot be routed using the Domain Name System (DNS) or ENUM/DNS (which is a standard that translates a telephone number into a Uniform Resource Identifier (URI) or IP address). A BGCF is normally used to determine the next hop, or next few hops of a session's route in an IMS network.

BGCFs are currently deployed as monolithic applications, with the protocol stack and routing logic collocated on a single server (or pool of servers). The capacity of each BGCF is therefore limited by the processing and storage capabilities of the server. However, if the processing and storage capabilities of the servers are increased, the efficiency of each BGCF may decrease when the BGCF's increased processing and/or storage capabilities are not required at all times. For example, if only 60% of the processing and storage capabilities are required 90% of the time, then for 90% of the time 40% of the BGCF's processing and storage capabilities are not being efficiently utilised.

Furthermore, the provision of the protocol stack and routing logic on a single server (or pool of servers) is unsuitable for deployment in a micro-services architecture.

According to a first technique, there is provided a signalling protocol routing system for determining a next destination for an incoming protocol message being routed across a communication network. The signalling protocol routing system comprising: a routing service module configured to convert the incoming protocol message into a deconstructed protocol message, and to generate a routing request; and a rules processing module configured to receive the deconstructed protocol message and the routing request from the routing service module, apply routing rules to the deconstructed protocol message to generate a results message, and transfer the results message to the routing service module, the results message comprising an indication of the next destination, wherein the routing service module is further configured to generate an outgoing protocol message based on the results message.

In embodiments, the routing service module is further configured to transfer the outgoing protocol message to the next destination.

In embodiments, the routing service module is provided at a first server, and the rules processing module is provided at a second server, different from the first server.

In embodiments, the routing request indicates which routing rules to apply to the deconstructed protocol message.

In embodiments, the signalling protocol routing system further comprises: a rules storage module for storing the routing rules, and wherein the rules processing module is further configured to retrieve the routing rules from the rules storage module prior to applying the routing rules.

In embodiments, the signalling protocol routing system further comprises: a plurality of routing service modules.

In embodiments, the plurality of routing service modules are provided at more than one server.

In embodiments, the plurality of routing service modules comprises at least one routing service module configured to receive the incoming protocol message in a first protocol, and at least one routing service module configured to receive the incoming protocol message in a second protocol, the first protocol being different from the second protocol.

In embodiments, the rules processing module applies first routing rules to the deconstructed protocol message, when the incoming protocol message is received in the first protocol, and the rules processing modules applies second routing rules to the deconstructed protocol message, when the incoming protocol message is received in the second protocol, wherein the first routing rules are different from the second routing rules.

In embodiments, the signalling protocol routing system further comprises: a plurality of rules processing modules.

In embodiments, the plurality of rules processing modules are provided at more than one server.

In embodiments, the plurality of rules processing modules are functionally identical.

In embodiments, the routing service module is configured to receive the incoming protocol message in a first protocol, and to generate the outgoing protocol message in a second protocol, the first protocol being different from the second protocol.

In embodiments, the results message comprises an instruction to reject the incoming protocol message with an error code.

In embodiments, the results message comprises an instruction to send the incoming protocol message to the next destination, and wherein the outgoing protocol message comprises the incoming protocol message.

In embodiments, the results message comprises an instruction to send the incoming protocol message to any one of a plurality of next destinations, and wherein the outgoing protocol message comprises the incoming protocol message.

In embodiments, the routing service module is further configured to transfer the outgoing protocol message to one of the plurality of next destinations.

In embodiments, the results message comprises a modified deconstructed protocol message.

In embodiments, the routing service module is configured to generate the outgoing protocol message by converting the modified deconstructed protocol message into the outgoing protocol message.

In embodiments, the results message comprises one or more modifications to the deconstructed protocol message.

In embodiments, the results message comprises a list of modifications to the deconstructed protocol message.

In embodiments, the routing service module is further configured to generate the outgoing protocol message by applying the modifications to the deconstructed protocol message, and then converting the modified deconstructed protocol message into the outgoing protocol message.

In embodiments, the routing service module is further configured to parse the incoming protocol message into a field map, and wherein the deconstructed protocol message comprises the field map.

In embodiments, the results message comprises one or more modifications to parameters and/or header fields of the field map.

In embodiments, the signalling protocol routing system comprises a breakout gateway control function for determining a next destination for an incoming SIP protocol message.

According to a second technique, there is provided a method for determining a next destination for an incoming protocol message being routed across a communication network. The method comprising: converting the incoming protocol message into a deconstructed protocol message at a routing service module; generating a routing request at the routing service module; transferring the deconstructed protocol message and the routing request to a rules processing module; applying routing rules to the deconstructed protocol message, at the rules processing module, to generate a results message; transferring the results message to the routing service module, the results message comprising an indication of the next destination; and generating an outgoing protocol message at the routing service module based on the received results message.

In embodiments, the method further comprises: transferring the outgoing protocol message to the next destination.

In embodiments, the method further comprises: providing the routing service module at a first server; and providing the rules processing module at a second server, wherein the second server is different from the first server.

In embodiments, the routing request indicates which routing rules to apply to the deconstructed protocol message.

In embodiments, the method further comprises: storing the routing rules in a rules storage module; and retrieving the routing rules from the rules storage module prior to applying the routing rules.

In embodiments, the method further comprises: providing a plurality of routing service modules.

In embodiments, the method further comprises: providing the plurality of routing service modules at more than one server.

In embodiments, the plurality of routing service modules comprises at least one routing service module configured to receive the incoming protocol message in a first protocol, and at least one routing service module configured to receive the incoming protocol message in a second protocol, the first protocol being different from the second protocol.

In embodiments, the method further comprises: applying first routing rules to the deconstructed protocol message, when the incoming protocol message is received in the first protocol; and applying second routing rules to the deconstructed protocol message, when the incoming protocol message is received in the second protocol, wherein the first routing rules are different from the second routing rules.

In embodiments, the method further comprises: providing a plurality of rules processing modules.

In embodiments, the method further comprises: providing the plurality of rules processing modules at more than one server.

In embodiments, the plurality of rules processing modules are functionally identical.

In embodiments, the method further comprises: receiving the incoming protocol message in a first protocol at the routing service module; and generating the outgoing protocol message in a second protocol at the routing service module, wherein the first protocol is different from the second protocol.

In embodiments, the results message comprises an instruction to reject the incoming protocol message with an error code.

In embodiments, the: results message comprises an instruction to send the incoming protocol message to the next destination, and wherein the outgoing protocol message comprises the incoming protocol message.

In embodiments, the results message comprises an instruction to send the incoming protocol message to any one of a plurality of next destinations, and wherein the outgoing protocol message comprises the incoming protocol message.

In embodiments, the method further comprises: transferring the outgoing protocol message to one of the plurality of next destinations.

In embodiments, the results message comprises a modified deconstructed protocol message.

In embodiments, the method further comprises: generating the outgoing protocol message by converting the modified deconstructed protocol message into the outgoing protocol message.

In embodiments, the results message comprises one or more modifications to the deconstructed protocol message.

In embodiments, the results message comprises a list of modifications to the deconstructed protocol message.

In embodiments, the method further comprises: generating the outgoing protocol message by applying the modifications to the deconstructed protocol message, and then converting the modified deconstructed protocol message into the outgoing protocol message.

In embodiments, the method further comprises: parsing the incoming protocol message into a field map, and wherein the deconstructed protocol message comprises the field map.

In embodiments, the results message comprises one or more modifications to parameters and/or header fields of the field map.

According to a third technique, there is provided a breakout gateway control function for performing the method as herein described.

BRIEF DESCRIPTIONS OF DRAWINGS

Embodiments will now be described with reference to the accompanying figures of which.

DETAILED DESCRIPTIONS

Broadly speaking, embodiments of the present invention provide a signalling protocol routing system comprising at least one routing service module and at least one rules processing module, the signalling protocol routing system being capable of accessing additional routing service modules and/or rules processing modules when required. The routing service modules convert protocol messages into deconstructed protocol messages, so that a rules processing module can apply routing rules to the deconstructed protocol messages and determine a route for a message.

Figure 1:
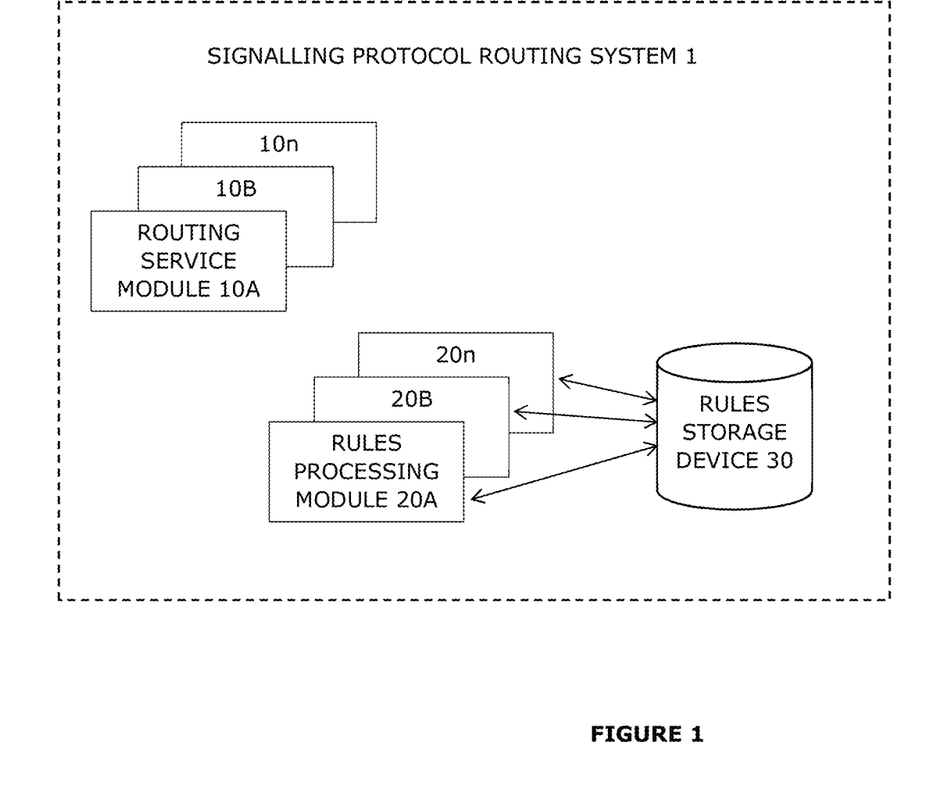
FIG. 1 illustrates schematically a signalling protocol routing system.

FIG. 1 illustrates a signalling protocol routing system 1 for determining a route for a communication session, such as a telephony call, between two or more participants, each participant using a telecommunication device such as a telephone/tablet/computer etc. A telephony call may be a voice call, video call and/or data call. For example, a calling user may want to establish a telephony call with a receiving user. In order to establish the call, a communication session may be required to be routed across one or more networks, from the calling user to the receiving user. The signalling protocol routing system 1 receives inbound messages, identifies the ultimate destination (the receiving user) of the message, determines the next one (or more) hops of the route of the session to the ultimate destination, and then sends the message to another signalling protocol routing system 1 or gateway which is the next one (or more) hops of the route of the session.

Returning to FIG. 1, the signalling protocol routing system 1 comprises at least one routing service module 10A, 10B, 10$n$, and at least one rules processing module 20A, 20B, 20$n$. The routing service module and the rules processing module are separate components. The signalling protocol routing system 1 does not require the routing service module and the rules processing module to be collocated on a single server (or pool of servers). Therefore, although the routing service modules 10A, 10B, 10$n$ and the rules processing modules 20A, 20B, 20$n$ are illustrated in FIG. 1 as next to each other, the routing service modules 10A, 10B, 10$n$ and the rules processing modules 20 A, 20B, 20$n$ of the same signalling protocol routing system 1 may be provided at different servers, at the same or different physical locations. The routing service modules 10A, 10B, 10$n$ and the rules processing modules 20A, 20B, 20$n$ communicate with each other via a communications interface.

A signalling protocol routing system 1 may comprise two different servers (or pools of servers), one of the servers (or pools of servers) providing the functions associated with the routing service module, and the other server (or pools of servers) providing the functions associated with the rules processing module. The two different servers (or pools of servers) may be scaled separately, such that the routing service module server (or pools of servers) may comprise one or more routing service modules and the rules processing module server (or pools of servers) may comprise one or more rules processing modules. The two different servers (or pools of servers) may be provided at the same or different physical locations. The servers (or pools of servers) providing the function associated with the routing service modules and the rules processing module may comprise at least one processor coupled to at least one memory.

The signalling protocol routing system 1 may access the one or more routing service modules and the one or more rules processing modules as required. For example, when the signalling protocol routing system 1 is required to route a plurality of messages, such that the signalling protocol routing system 1 requires access to more than one routing service module, then the signalling protocol routing system 1 is able to access a plurality of routing service modules as required. This increases the efficiency of the signalling protocol routing system, as it is able to utilise only required modules, without maintaining non-required modules. Therefore, the signalling protocol routing system only uses, at any one time, the routing service modules and the rules processing modules which are required.

By enabling the routing service modules and the rules processing modules to be provided at separate servers, the routing service modules and the rules processing modules may be deployed separately using online computer processing environments.

Alternatively, a routing service module and a rules processing module of a signalling protocol routing system may be provided at the same server if required.

The signalling protocol routing system may comprise more than one routing service module 10A, 10B, 10$n$. A routing service module 10A, 10B, 10$n$ receives incoming protocol messages, converts the inbound protocol messages into a deconstructed protocol format, and transfers the deconstructed protocol message to a rules processing module 20A, 20B, 20$n$ together with a routing request for the deconstructed protocol message. The routing service module 10A, 10B, 10$n$ creates a deconstructed protocol message which is an abstract representation of the received protocol message for processing by a rules processing module 20A, 20B, 20$n$. The routing service module 10A, 10B, 10$n$ comprises no configuration information indicating how to route the received protocol messages, and defers the routing decision to a rules processing module 20A, 20B, 20$n$.

The signalling protocol routing system may comprise more than one rules processing module 20A, 20B, 20$n$, all of the rules processing modules 20A, 20B, 20$n$ being functionally identical. A routing service module 10A, 10B, 10$n$ may transfer a deconstructed protocol message to any one of the rules processing modules 20A, 20B, 20$n$. Since all of the rules processing modules 20A, 20B, 20$n$ are stateless, any one of the rules processing modules 20A, 20B, 20$n$, may be selected to determine a route for any inbound protocol message received at the signalling protocol routing system. Standard load-balancing techniques, for example DNS round-robin, may be used to select a rules processing modules 20A, 20B, 20$n$ each time an inbound protocol message is received.

According to one embodiment, the routing service module 10A, 10B, 10$n$ may parse the inbound protocol message into a field map which can be read by the rules processing module 20A, 20B, 20n, the deconstructed protocol message comprising the field map. The message is broken down into header fields, header field parameters etc. and stored as a map. According to another embodiment, the routing service module 10A, 10B, 10n may parse the incoming protocol message into a map of string values, representing the message, the deconstructed protocol message comprising the map of string values.

Each different signalling protocol, such as SIP or H.323 protocol has a different protocol message structure, with each different protocol message structure having different header fields, header field parameters etc. The routing service module 10A, 10B, 10n transforms the inbound protocol specific message into a deconstructed protocol message, it separates out the constituent parts of a protocol message, so that it is no longer in protocol format. This enables the rules processing module 20 to process deconstructed protocol messages which were initially in different protocols.

The rules processing module 20A, 20B, 20n comprises configuration information, such as predetermined routing rules, for determining how to route the received messages. The predetermined routing rules are different depending on the protocol of the received message. Therefore, the routing service module 10A, 10B, 10n indicates which set of rules are to be applied to the deconstructed protocol messages in the routing request that it sends to the rules processing module. The indication as to which set of rules are to be applied to the deconstructed protocol messages may comprise a piece of metadata. Another example of such a piece of metadata might be a configuration revision number (allowing multiple different versions of a single set of rules to be configured and applied by the rules processing modules).

A rules processing module 20A, 20B, 20n receives a deconstructed protocol message from a routing service module 10A, 10B, 10n, applies the routing rules to the message and generates a results message. The routing rules may define where the destination address is stored in the deconstructed protocol message. By applying the routing rules, the rules processing module 20A, 20B, 20n can determine the next hop for the message in order to reach its ultimate destination. Application of the routing rules to the deconstructed message may modify the message to create the results message, for example, a modification to the address of the next hop on its journey.

The results message is then transferred back to the routing service module 10A, 10B, 10n which transferred the deconstructed message to the rules processing module 20A, 20B, 20n.

The rules processing modules 20A, 20B, 20n are protocol neutral, in that the rules processing modules 20A, 20B, 20n may be used to apply routing rules to messages received in different protocols. However, different rules may be applied by the rules processing modules 20A, 20B, 20n in dependence on the protocol of the inbound message. This is because different protocols have different header fields, header field parameters etc. For example, a rules processing module that previously applied routing rules to a deconstructed message, which was received at a routing service module in SIP protocol, may also be used to apply a different set of routing rules to a deconstructed message, which was received at a routing service module in H.323 protocol. As stated above, the routing service module 10A, 10B, 10n indicates which set of rules are to be applied to the deconstructed protocol message.

Figure 2:
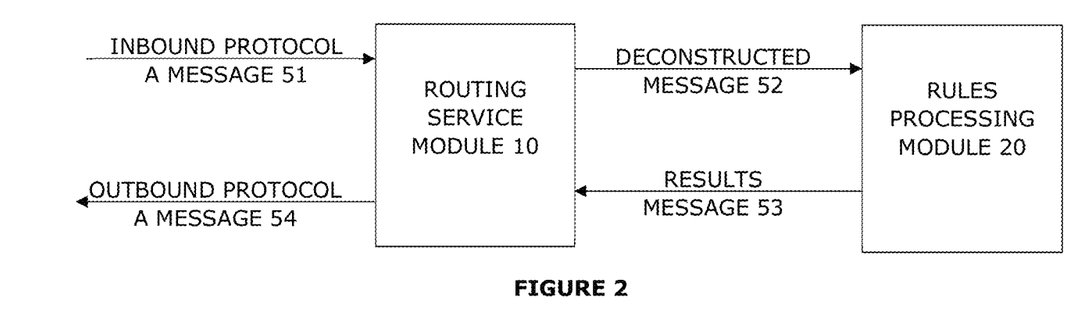
FIG. 2 illustrates schematically a routing pathway.

According to one embodiment, a signalling protocol routing system 1 may be protocol specific. With reference to FIG. 2, a routing service module 10 is configured to receive inbound protocol A (for example, SIP) communications 51. The routing service module 10 converts the received inbound protocol A message 51 into a deconstructed message 52 for processing by the rules processing module 20. Following application of routing rules, a results message 53 is transferred to the routing service module 10 which generated the deconstructed message 52, and the routing service module 10 generates an outbound protocol A message 54 based on the results message.

Figure 3:
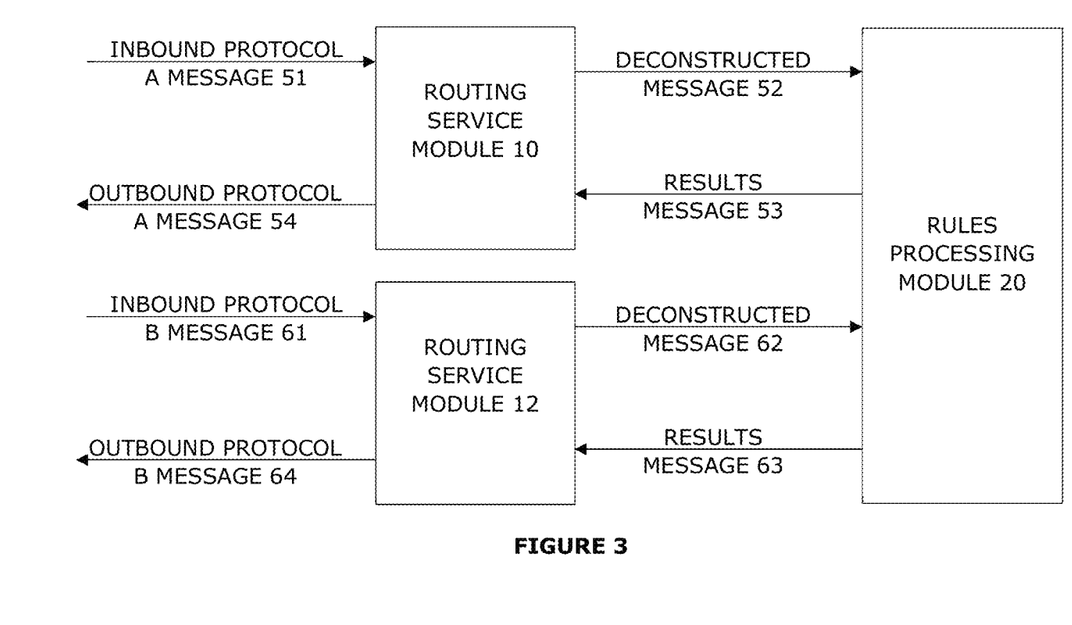
FIG. 3 illustrates schematically a routing pathway.

As stated above, the rules processing modules 20A, 20B, . . . 20n may apply routing rules to deconstructed messages received in different protocols. With reference to FIG. 3, a routing service module 10 is configured to receive inbound protocol A (for example, SIP) communications 51. The routing service module 10 converts the received inbound protocol A message 51 into a deconstructed message 52 for processing by the rules processing module 20. In addition, a routing service module 12 is configured to receive inbound protocol B (for example, H.323) communications 61. The routing service module 12 converts the received inbound protocol B message 61 into a deconstructed message 62 for processing by the rules processing module 20. Following application of routing rules by the rules processing module 20 to the deconstructed message 52, a results message 53 is transferred to the routing service module 10 which generated the deconstructed message 52, and the routing service module 10 generates an outbound protocol A message 54 based on the results message. Furthermore, following application of routing rules by the rules processing module 20 to the deconstructed message 62, a results message 63 is transferred to the routing service module 12 which generated the deconstructed message 62, and the routing service module 12 generates an outbound protocol B message 64 based on the results message. The rules processing module 20 is capable of routing different protocol messages.

Figure 4:
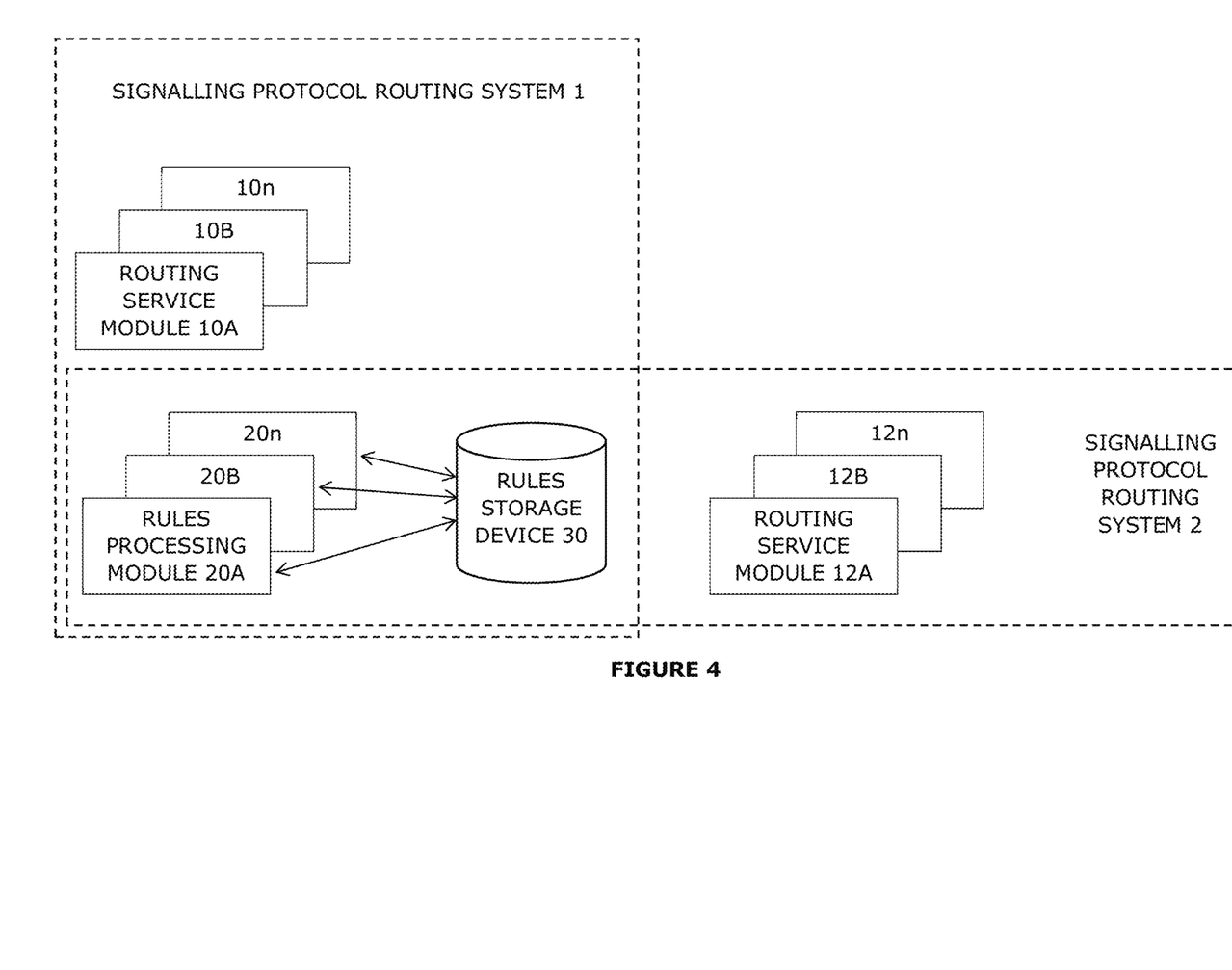
FIG. 4 illustrates schematically a signalling protocol routing system.

FIG. 4, illustrates a signalling protocol routing system 1 comprising routing service modules 10 configured to receive protocol A messages and a signalling protocol routing system 2 comprising routing service modules 12 configured to receive protocol B messages, protocol A being different from protocol B. The rules processing modules 20A, 20B, . . . 20n may be shared by multiple, signalling protocol routing systems.

Alternatively, a signalling protocol routing system 1 may comprise multiple routing service modules configured to receive different protocol messages. For example, a signalling protocol routing system 1 may comprise routing service modules 10 configured to receive protocol A messages, routing service modules 12 configured to receive protocol B messages, protocol A being different from protocol B, and rules processing modules 20A, 20B, . . . 20n which may be utilised by any of the routing service modules.

Furthermore, because the rules processing modules 20 are generic, they may be used to perform tasks other than message routing. For example, the rules processing modules may be used for taking other rule-based decisions, in which case a different set of rules may be applied to the deconstructed protocol message dependent on the task to be performed.

Figure 5:
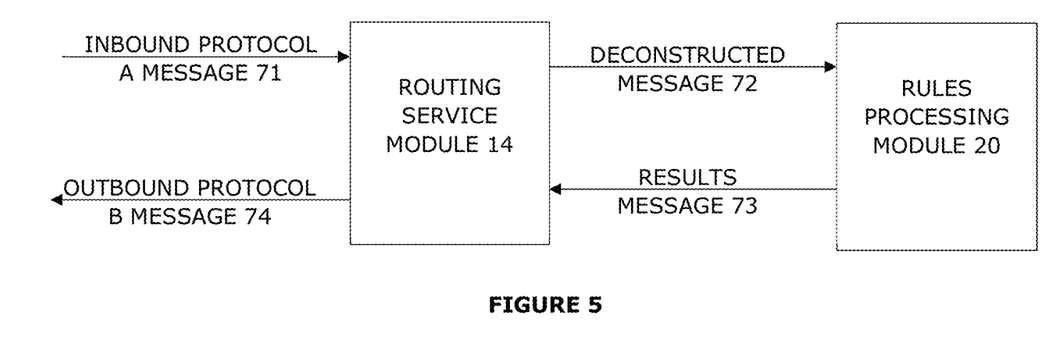
FIG. 5 illustrates schematically a routing pathway.

According to another embodiment, a routing service module 10 may convert a protocol message received in a first protocol into a second different protocol. With reference to FIG. 5, a routing service module 14 is configured to receive inbound protocol A (for example, SIP) communications 71. The routing service module 14 converts the received inbound protocol A message 71 into a deconstructed message 72 for processing by the rules processing module 20. Following application of routing rules, a results message 73 is transferred to the routing service module 14 which generated the deconstructed message 72. The routing service module 14 generates an outbound protocol B message 74 based on the results message.

Following application of the routing rules by the rules processing module 20 to the deconstructed protocol message, a results message is generated. The results message generated by the rules processing module 20 comprises an indication of the next destination (next hop) for the message.

The results message may comprise:
an instruction to reject the message with an error code;
an instruction to send the message on to an identified destination;
an instruction to load-balance between more than one identified destination (because the rules processing module is stateless, load-balancing is carried out by the routing service module, based on the possible destinations returned by the rules processing module);
a modified deconstructed protocol message;
at least one modification to the deconstructed protocol message.

Load-balancing refers to spreading out of network traffic between a set of servers any of which can perform the work required by the request. For example, the routing service modules, spread out call sessions evenly between a plurality of signalling protocol routing systems, any one of which could handle the particular call. When an instruction to load-balance between more than one identified destinations is received, the routing service module, performs load balancing based on the possible destinations returned by the rules processing module.

A modification to the deconstructed protocol message may indicate the address of the next hop. In addition, other modifications may also be applied to the message, for example stripping out fields that should not be sent on to the next hop, incrementing counters, etc.

When the rules processing module 20 generates a modified message, then the results message may be very similar to the received deconstructed protocol message, but with elements of the deconstructed protocol message modified following application of the routing rules. For example, an entire amended deconstructed protocol message, following application of the rules, may be sent back to the routing service module, as a results message, such as an entire updated field map of the deconstructed protocol message.

Application of the routing rules to a deconstructed SIP protocol message may result in the removal of one or more header field parameters, the insertion of one or more parameters into a header field (such as a Uniform Resource Identifier into a Route header field), the amendment of one or more header field parameters, the insertion of one or more header fields, such as a Record-Route header field, etc.

When the rules processing module 20 generates modifications to the deconstructed protocol message, then the results message may contain only the amended parameters/fields of the deconstructed protocol message or a list of the updates made/to be made to the deconstructed protocol message.

As stated above, following application of the routing rules, the results message is transferred from the rules processing module 20 to the routing service module. The routing service module then generates an outgoing protocol message based on the received results message. The routing service module 10 interprets the returned results message and generates the outgoing protocol message. The results message may indicate modifications to be applied to the message before sending it on.

When the results message generated by the rules processing module 20 comprises an instruction to reject the message with an error code, then the routing service module 10 generates an outgoing protocol message comprising the received incoming protocol message together with an error code, and sends the outgoing protocol message back to the sender.

When the results message generated by the rules processing module 20 comprises an instruction to send the message on to an identified destination, then the routing service module 10 generates an outgoing protocol message and sends the outgoing protocol message to the identified destination. The results message may also include a modified deconstructed protocol message to be converted into the outgoing protocol message, or at least one modification to the deconstructed protocol message to be applied to deconstructed protocol message before conversion into the outgoing protocol message, and prior to sending the outgoing message to the identified destination.

When the results message generated by the rules processing module 20 comprises an instruction to load-balance between more than one identified destination, then the routing service module 10 generates an outgoing protocol message, and sends the outgoing protocol message to one of the identified destinations, selected as a result of load-balancing. The results message may also include a modified deconstructed protocol message to be converted into the outgoing protocol message, or at least one modification to the deconstructed protocol message to be applied to the deconstructed protocol message before conversion into the outgoing protocol message, and prior to sending the outgoing message to the identified destination.

When the results message generated by the rules processing module 20 comprises a modified deconstructed protocol message, then the routing service module 10 converts the modified deconstructed protocol message into the outgoing protocol message.

When the results message generated by the rules processing module 20 comprises at least one modification to the deconstructed protocol message, then the routing service module 10 applies the modifications to the deconstructed protocol message, and converts the modified deconstructed protocol message into the outgoing protocol message.

The outgoing protocol message may be a near-exact copy of the received protocol message, for example with minor changes applied to some headers, e.g. stripping off any Route headers that explicitly pointed to this signalling protocol routing system 1, incrementing counters in headers, etc.

The routing service module may convert the deconstructed protocol message back into the protocol of the initial received incoming message, or may convert the protocol neutral message into different protocol, different from the protocol of the initial received message.

Below is an example of a SIP "INVITE" message received at a signalling protocol routing system 1:

INVITE sip:7795550000@10.0.131.100 SIP/2.0
Via: SIP/2.0/TCP

```
10.0.101.82:5052;rport;branch=z9hG4bKPj.66Jr7v.cdID97QZKuTFX6cXWj
EQHltc
Record-Route:
<sip:scscf.example.com:5054;transport=TCP;lr;service=scscf;billing-
role=charge-orig>
Via: SIP/2.0/TCP
10.0.131.141:5058;rport=40473;received=10.0.131.141;branch=z9hG4b
KPjwfGT4yTvtESJr5.RLuFXNQA7I0ygmdDo
Record-Route: <sip:10.0.131.141:5058;transport=TCP;lr>
Record-Route: <sip:2d1vBO5FAa@10.0.131.112:5060;transport=TCP;lr>
From:
<sip:8345550731@example.com>;tag=3b39437d554920bfee3cc8a208d2
04a6
To: <tel:7795550000;phone-context=example.com>
Call-ID:d437bd14167dc6c0116961d69a7ca468
CSeq: 2 INVITE
Via: SIP/2.0/TCP
10.0.30.3:13793;rport=43236;received=10.0.186.217;branch=z9hG4bK1
485432728.6144137
Max-Forwards: 67
User-Agent: User Agent Name
Contact:
<sip:ua@10.0.30.3:13793;transport=TCP;ob>;+sip.instance="<urn:uuid
:d8eaa782-1c4c-597c-bde3-ae79005cf634>"
Supported: gruu
P-Asserted-Identity: <sip:8345550731@example.com>
P-Charging-Function-Addresses: ccf=cdf.example.com
P-Charging-Vector: icid-
value="d437bd14167dc6c0116961d69a7ca468";orig-
ioi=example.com;icid-generated-at=10.0.131.112
Session-Expires: 600
P-Served-User:
<sip:8345550731@example.com>;sescase=orig;regstate=reg
Route: <sip: bgcf.example.com;lr>
Content-Length: 0
```

The signalling protocol routing system 1 utilises a SIP routing service module 10A to parse the message into a deconstructed protocol format which can be read by a rules processing module 20. Below is an example of the above received SIP message after it has been parsed into a field map by a SIP routing service module 10A:

```
"field_map":{
    "ruri":"sip:7795550000@10.0.131.100",
    "user_ruri":"7795550000","domain_ruri":"10.0.131.100",
    "p_billing-role_hdr_Record-Route_uri":"charge-orig",
    "p_branch_hdr_Via":"z9hG4bKPj.66Jr7v.cdID97QZKuTFX6cXWjEQHltc",
    "p_received_hdr_Via":"10.0.101.82",
    "p_rport_hdr_Via":"39516",
    "hdr_Via":[
        "SIP/2.0/TCP
10.0.101.82:5052;rport=39516;received=10.0.101.82;branch=z9hG4bKP
j.66Jr7v.cdID97QZKuTFX6cXWjEQHltc",
        "SIP/2.0/TCP
10.0.131.141:5058;rport=40473;received=10.0.131.141;branch=z9hG4b
KPjwfGT4yTvtESJr5.RLuFXNQA7I0ygmdDo",
        "SIP/2.0/TCP
10.0.30.3:13793;rport=43236;received=10.0.186.217;branch=z9hG4bK1
485432728.6144137"
    ],
    "hdr_Record-Route":[
        "<sip:scscf.example.com:5054;transport=TCP;lr;service=scscf;billin
g-role=charge-orig>",
        "<sip:10.0.131.141:5058;transport=TCP;lr>",
        "<sip:2d1vBO5FAa@10.0.131.112:5060;transport=TCP;lr>"
    ],
    "p_lr_hdr_Record-Route_uri":"",
    "p_transport_hdr_Record-Route_uri":"TCP",
    "p_service_hdr_Record-Route_uri":"scscf",
    "uri_hdr_Record-Route":[
        "sip:scscf.example.com:5054;transport=TCP;lr;service=scscf;billing-
role=charge-orig",
        "sip:10.0.131.141:5058;transport=TCP;lr",
        "sip: 2d1vBO5FAa@10.0.131.112:5060;transport=TCP;lr"
```

```
    ],
        "hdr_From":"<sip:8345550731@example.com>;tag=3b39437d554920
bfee3cc8a208d204a6",
        "uri_hdr_From":"<sip:8345550731@example.com>",
        "p_tag_hdr_From":"3b39437d554920bfee3cc8a208d204a6",
        "hdr_To":"<tel:7795550000;phone-context=example.com>",
        "uri_hdr_To":"<tel:7795550000; phone-context=example.com>",
        "p_phone-context_hdr_To_uri_user":"example.com",
        "hdr_Call-ID":"d437bd14167dc6c0116961d69a7ca468",
        "hdr_CSeq":"2 INVITE",
        "hdr_Max-Forwards":"66",
        "hdr_User-Agent":"User Agent Name",
        "hdr_Contact":"<sip:ua@10.0.30.3:13793;transport=TCP;ob>;+sip.ins
tance=\"<urn:uuid:d8eaa782-1c4c-597c-bde3-ae79005cf634>\"",
        "uri_hdr_Contact":"<sip:ua@10.0.30.3:13793;transport=TCP;ob>",
        "p_+sip.instance_hdr_Contact":"\"<urn:uuid:d8eaa782-1c4c-597c-
bde3-ae79005cf634>\"",
        "p_transport_hdr_Contact_uri":"TCP","p_ob_hdr_Contact_uri":"",
        "hdr_Supported":"gruu",
        "hdr_P-Asserted-Identity":"<sip:8345550731@example.com>",
        "hdr_P-Charging-Function-Addresses":"ccf=cdf.example.com",
        "p_ccf_hdr_P-Charging-Function-Addresses":"cdf.example.com",
        "hdr_P-Charging-Vector":"icid-
value=\"d437bd14167dc6c0116961d69a7ca468\";orig-
ioi=example.com;icid-generated-at=10.0.131.112",
        "p_icid-generated-at_hdr_P-Charging-Vector":"10.0.131.112",
        "p_orig-ioi_hdr_P-Charging-Vector":"example.com",
        "hdr_Session-Expires":"600",
        "p_expires_hdr_Session-Expires":"600",
        "hdr_P-Served-
User":"<sip:8345550731@example.com>;sescase=orig;regstate=reg",
        "hdr_Content-Length":"0"
}
```

The routing service module 10A transfers the parsed field map to the rules processing module 20. The rules processing module 20 applies routing rules to the deconstructed protocol message and generates a results message, which is transferred to the routing service module 10.

In the below example, the results message comprises modifications, in the form of a results field map, to the deconstructed protocol message. Only a list of the updates to the deconstructed protocol message are transferred to the routing service module 10A. The below field map indicates to the routing service module 10A that it should replace the current list of "Route" headers in the deconstructed protocol message with headers generated from the supplied list of URIs (one URI, in this case):

```
"field_map": {
    "uri_hdr_Route": ["sip:10.0.30.3:5072;transport=tcp"]
}
```

The routing service module 10 applies the modifications to the deconstructed protocol message by replacing the current list of "Route" headers in the message with headers generated from the supplied list of URIs, and then converts the modified deconstructed protocol message into the outgoing protocol message. The outgoing protocol message is then sent to the new destination (the next hop in the route).

The routing rules applied by the rules processing module 20 are predefined by a user and are dependent on how the service provider has set up their network. The user who predefines the rules requires a knowledge of the protocol for which the rules are being defined, for example, because different protocols use different header fields/parameters etc. However, since the rules processing module 20 receive deconstructed protocol messages, the same rules processing module 20 may process messages which have been received in multiple different protocols, at one or more different routing service modules, by applying different rules.

Each protocol has its own set of routing rules, which are written such that they can be applied to a deconstructed protocol message. It is possible that some rules may overlap between different protocols, for example when there are commonalities between different protocols. The rules may be stored in a storage device 30 either provided at the rules processing module 20, or separate from, but accessible by, the rules processing module 20. According to one embodiment, the rules may be accessed by a plurality of different rules processing modules 20. Each set of rules may be stored in a different area of the storage device 30, unless there is a rules overlap as discussed above.

The rules are applied by the rules processing module 20 as required. For example, a deconstructed SIP protocol message may be processed by a rules processing module 20 using the rules starting with the rule stored at storage location 1, whilst a deconstructed H.323 protocol message may be processed using the rules starting with the rule stored at storage location 200 etc. The storage location of the routing rules being provided as a parameter in the request from the routing service module. Alternatively, there may be a different rules processing module 20 provided for each different protocol.

Figure 6:
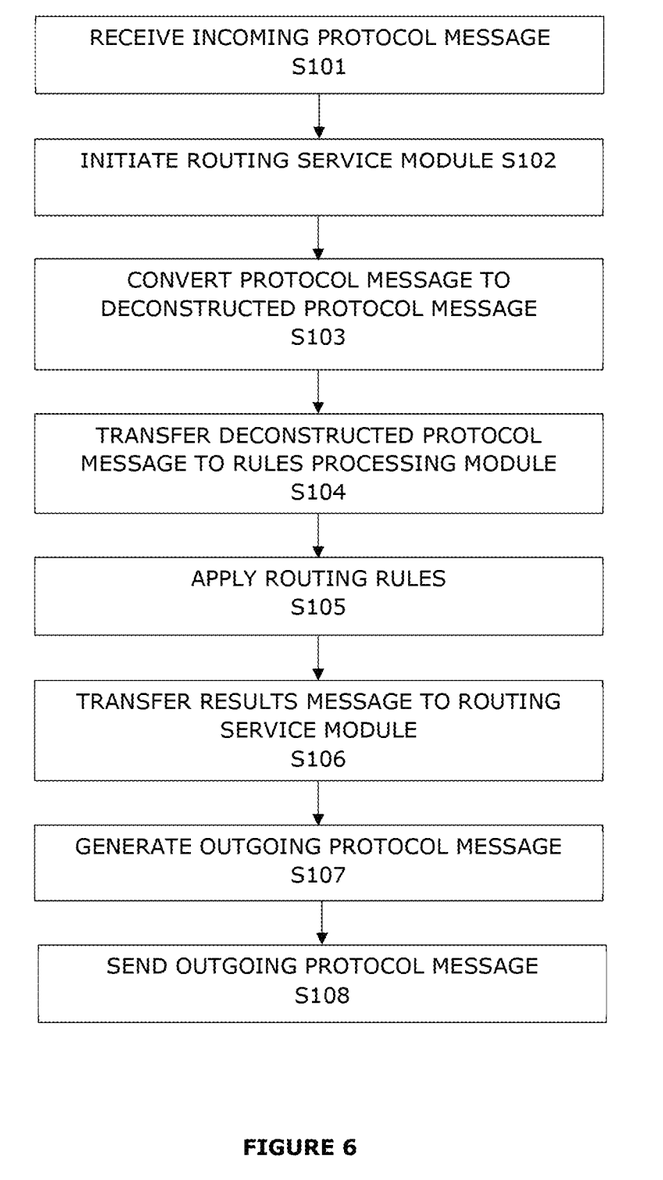
FIG. 6 illustrates a process flow diagram.

FIG. 6 illustrates a process flow diagram. At step S101 an incoming protocol message is received at a signalling protocol routing system. The signalling protocol routing system initiates a routing service module at step S102. The routing service module is selected based on the protocol of the received message and the capacity of the available routing service modules, available to the signalling protocol routing system. The selected routing service module converts the incoming protocol specific message into a deconstructed protocol message at step S103 and transfers the deconstructed protocol message to a rules processing module at step S104. At step S105 routing rules are applied to the deconstructed protocol message by the rules processing module and a results message is transferred to the routing service module at step S106. At step S107, the routing service module interprets the results message and generates an outgoing protocol message. At step S108, the outgoing protocol message is sent.

As stated above, the signalling protocol routing system determines one or more hops of the route of a communication session. Therefore, the signalling protocol routing system sends the outgoing protocol message to the next hop in the route, which may be another signalling protocol routing system within the same network, or a gateway for breakout to another network.

According to one embodiment, the signalling protocol routing system described above may be utilised as a breakout gateway control function (BGCF) in an IMS network. The BGCF determines the next hop in the route of a telephony session initiated in the IMS network and destined for a network which does not use SIP protocol, such as a circuit switched network. The circuit switched network can be any legacy network, PSTN or other wireless networks such as Global System for Mobile Communications (GSM), and Code Division Multiple Access (CDMA) wireless networks.

There may be multiple BGCFs within an operator's network. The BGCFs process requests for routing from a Serving-Call Session Control Function (S-CSCF), when the S-CSCF has determined that the session cannot be routed using DNS or ENUM/DNS.

The BGCFs determine the next hop for SIP messages; select the network in which the interworking with the PSTN/CS network is to occur and forward the SIP message to a BGCF/MGCF in that network.

Figure 7:
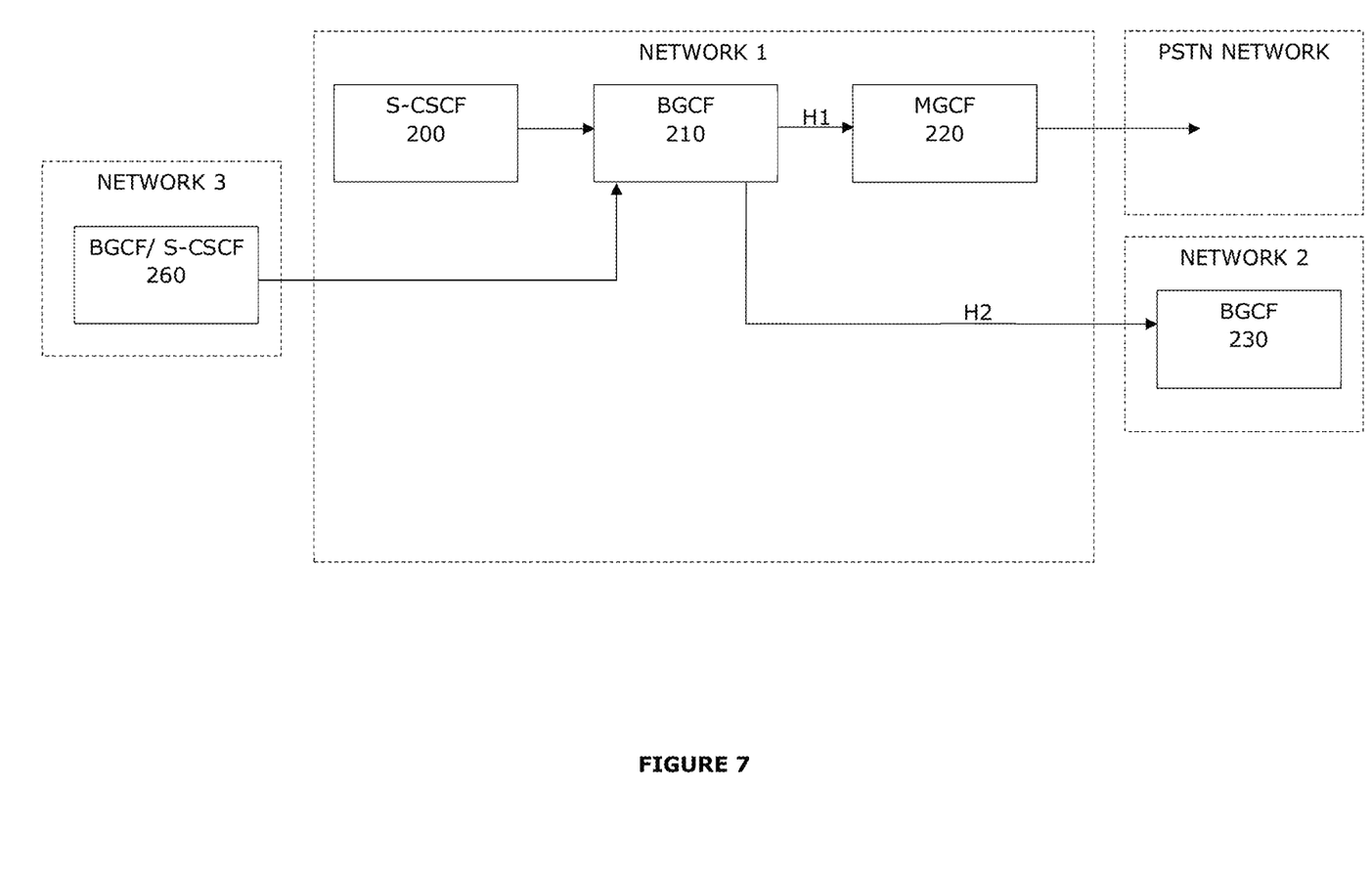
FIG. 7 illustrates schematically a plurality of networks and signalling protocol routing systems.

With reference to FIG. 7, the signalling protocol routing system 210 receives requests for routing (incoming protocol messages) from the S-CSCF 200. A routing service module of the signalling protocol routing system 210, converts the incoming protocol message into a deconstructed protocol message and transfers it to a rules processing module. The rules processing module of the signalling protocol routing system 210 determines that breakout is to occur in the same network (network 1) in which the signalling protocol routing system 210 is located, selects a Media Gateway control function (MGCF) 220 that will be responsible for the interworking with the PSTN network, the MGCF being located in the same network as the signalling protocol routing system 210, and generates a results message indicating that the session is to be routed to that MGCF. The routing service module generates an outgoing protocol message and transfers it to the MGCF. The signalling protocol routing system 210 determines the next hop H1 for routing a SIP message.

When a rules processing module of the signalling protocol routing system 210 determines that breakout is to occur in another network (network 2), then the rules processing module selects the network (network 2) in which the interworking with the PSTN/CS network is to occur, selects a signalling protocol routing system 230 in that selected network, and generates a results message indicating that the session is to be routed to signalling protocol routing system 230. The routing service module generates an outgoing protocol message and transfers it to the signalling protocol routing system 230. The signalling protocol routing system 210 determines the next hop, H2, for routing a SIP message.

It is also possible for another IMS network (network 3) to send traffic into the BGCF 210. Such traffic would normally come from a BGCF 260 in a remote network, but could also come from the S-CSCF 260 in that remote network.

The signalling protocol routing system 210 functioning as a BGCF determines the route of the message based on local policy, as defined in the routing rules. The route is determined following application of the routing rules to the deconstructed protocol message.

The signalling protocol routing system is concerned with the initial routing of the call, a hop in the route of a call, such that the session is sent to the right network/part of the network. Once the signalling protocol routing system has been utilised for the initial routing, the signalling protocol routing system is no longer required for the call, the call does not go via the signalling protocol routing system.

The provision of separate routing service modules and rules processing modules results in the separation of responsibilities, with each component performing its own task. In addition, independent scaling of the routing service modules and the rules processing modules is possible. Furthermore, because the rules processing modules applies routing rules to deconstructed protocol messages, the rules processing modules can be used with all protocol messages. Consequently, the signalling protocol routing system may be provided having a micro-services architecture.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be non-transitory, and may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

What is claimed is:

1. A signalling protocol routing system for determining a next destination for an incoming protocol message being routed across a communication network, the signalling protocol routing system comprising:
    a routing service module configured to convert the incoming protocol message into a deconstructed protocol message, and to generate a routing request; and
    a rules processing module configured to:
        receive the deconstructed protocol message and the routing request from the routing service module;
        apply routing rules to the deconstructed protocol message to generate a results message, wherein the results message comprises a list of modifications to the deconstructed protocol message; and
        transfer the results message to the routing service module, the results message comprising an indication of the next destination,
    wherein the routing service module is further configured to generate an outgoing protocol message based on the results message.

2. The signalling protocol routing system according to claim 1, wherein the routing service module is further configured to transfer the outgoing protocol message to the next destination.

3. The signalling protocol routing system according to claim 1, wherein the routing service module is provided at a first server, and the rules processing module is provided at a second server, different from the first server.

4. The signalling protocol routing system according to claim 1, wherein the routing request indicates which routing rules to apply to the deconstructed protocol message.

5. The signalling protocol routing system according claim 1, further comprising: a rules storage module for storing the routing rules, and wherein the rules processing module is further configured to retrieve the routing rules from the rules storage module prior to applying the routing rules.

6. The signalling protocol routing system according to claim 1, further comprising: a plurality of routing service modules provided at one or more servers.

7. The signalling protocol routing system according to claim 6, wherein the plurality of routing service modules comprises at least one routing service module configured to receive the incoming protocol message in a first protocol, and at least one routing service module configured to receive the incoming protocol message in a second protocol, the first protocol being different from the second protocol.

8. The signalling protocol routing system according to claim 7, wherein the rules processing module applies first routing rules to the deconstructed protocol message, when the incoming protocol message is received in the first protocol, and the rules processing module applies second routing rules to the deconstructed protocol message, when the incoming protocol message is received in the second protocol, wherein the first routing rules are different from the second routing rules.

9. The signalling protocol routing system according to claim 6, further comprising: a plurality of rules processing modules provided at one or more servers.

10. The signalling protocol routing system according to claim 1, wherein the routing service module is configured to receive the incoming protocol message in a first protocol, and to generate the outgoing protocol message in a second protocol, the first protocol being different from the second protocol.

11. The signalling protocol routing system according to claim 1, wherein the results message comprises an instruction to reject the incoming protocol message with an error code.

12. The signalling protocol routing system according to claim 1, wherein the results message comprises an instruction to send the incoming protocol message to the next destination, and wherein the outgoing protocol message comprises the incoming protocol message.

13. The signalling protocol routing system according to claim 1, wherein the results message comprises an instruction to send the incoming protocol message to any one of a plurality of next destinations, and wherein the outgoing protocol message comprises the incoming protocol message.

14. The signalling protocol routing system according to claim 1, wherein the results message comprises a modified deconstructed protocol message, and wherein the routing service module is configured to generate the outgoing protocol message by converting the modified deconstructed protocol message into the outgoing protocol message.

15. The signalling protocol routing system according to claim 1, wherein the results message comprises one or more modifications to the deconstructed protocol message.

16. The signalling protocol routing system according to claim 15, wherein the routing service module is further configured to generate the outgoing protocol message by applying the modifications to the deconstructed protocol message, and then converting the modified deconstructed protocol message into the outgoing protocol message.

17. The signalling protocol routing system of claim 1, wherein the signalling protocol routing system comprises a breakout gateway control function for determining a next destination for an incoming SIP protocol message.

18. A method for determining a next destination for an incoming protocol message being routed across a communication network, the method comprising:
    converting the incoming protocol message into a deconstructed protocol message at a routing service module;
    generating a routing request at the routing service module;
    transferring the deconstructed protocol message and the routing request to a rules processing module;
    applying routing rules to the deconstructed protocol message, at the rules processing module, to generate a results message, wherein the results message comprises a list of modifications to the deconstructed protocol message;

transferring the results message to the routing service module, the results message comprising an indication of the next destination; and generating an outgoing protocol message at the routing service module based on the received results message.

19. The method of claim 18, wherein the routing request indicates which routing rules to apply to the deconstructed protocol message.

20. A breakout gateway control function for performing a method for determining a next destination for an incoming protocol message being routed across a communication network, the method comprising:

converting the incoming protocol message into a deconstructed protocol message at a routing service module;

generating a routing request at the routing service module;

transferring the deconstructed protocol message and the routing request to a rules processing module;

applying routing rules to the deconstructed protocol message, at the rules processing module, to generate a results message, wherein the results message comprises a list of modifications to the deconstructed protocol message;

transferring the results message to the routing service module, the results message comprising an indication of the next destination; and generating an outgoing protocol message at the routing service module based on the received results message.

* * * * *